March 24, 1936.     F. S. HARRIS     2,034,901
FISHING ROD
Filed April 17, 1935
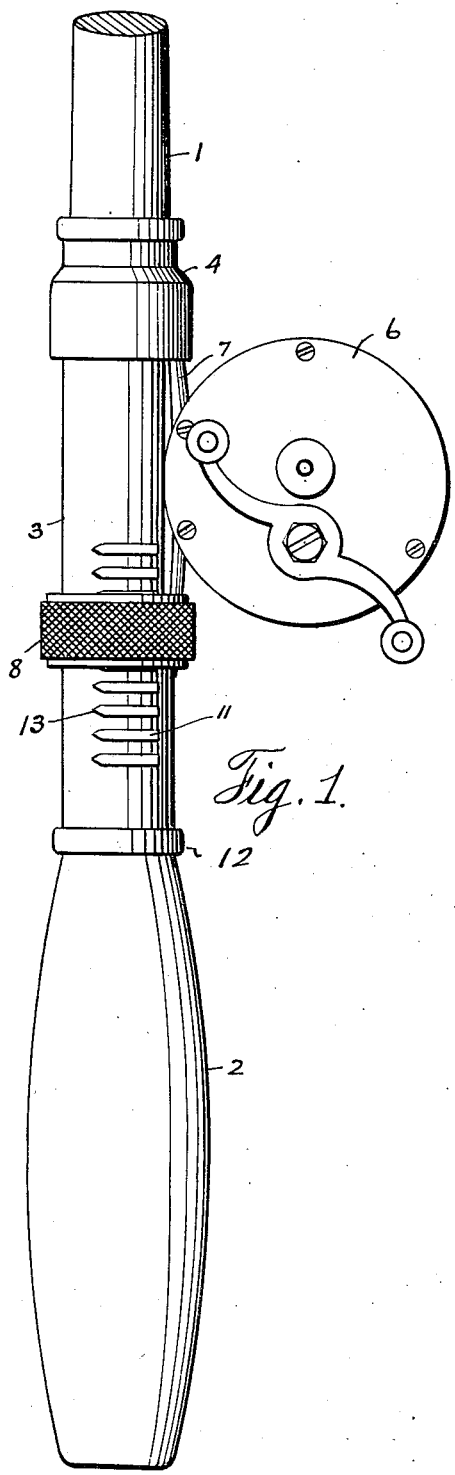
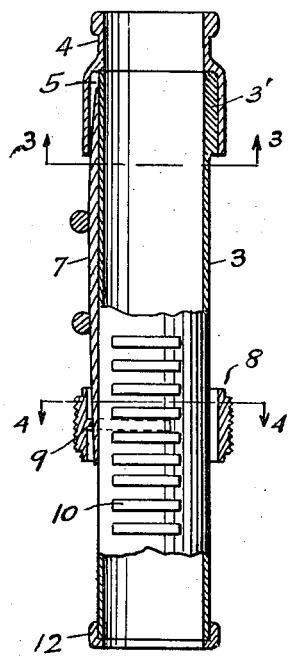
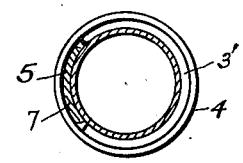
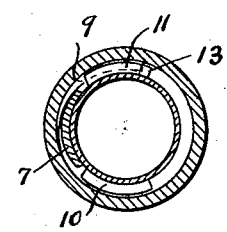
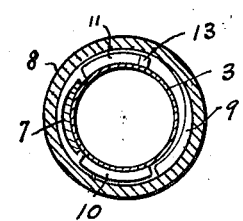
Inventor
Ferris S. Harris
By Hardway Cathey
Attorneys Patented Mar. 24, 1936

2,034,901

UNITED STATES PATENT OFFICE 2,034,901

FISHING ROD

Ferris S. Harris, Houston, Tex.

Application April 17, 1935, Serial No. 16,855

3 Claims. (Cl. 43—22)

This invention relates to a fishing rod and has more particular relation to means for securing the reel to the butt end of the rod.

An object to the invention is to provide a sleeve adapted to be fitted over the butt end of a fishing rod and having a retainer at one end to receive one end of the reel anchor with a releasable retaining ring on the sleeve to engage and retain the other end of said anchor, said sleeve and retaining ring having interengaging parts whereby the retaining ring may be retained in its active or retaining position, or readily released.

When the fishing rod is not in use, it is desirable to demount the reel, and when the rod is being used, it is desirable that the reel be securely mounted on the butt end thereof for use. The invention herein disclosed embodies means whereby the reel may be maintained securely mounted or be released, as desired.

With the above and other objects in view, the invention has particular relation, and arrangement of parts, an example of which is given in this specification and illustrated in the accompanying drawing, wherein:

Figure 1 shows a side view of the butt end of the fishing rod, showing the reel mounted and secured thereon.

Figure 2 shows a side view, partly in section, of the reel-supporting sleeve.

Figure 3 shows a cross-sectional view taken on the line 3—3 of Figure 2.

Figure 4 shows a cross-sectional view taken on the line 4—4 of Figure 2, and

Figure 5 shows a sectional view taken on the line 4—4 of Figure 2 and showing the retainer ring released.

Referring now more particularly to the drawing, wherein like numerals of reference designate the same parts in each of the figures, the numeral 1 designates a fishing rod having the grip 2 at the butt end thereof.

On the end of the rod adjacent the grip 2 there is a sleeve 3. The forward end of the sleeve is outwardly thickened, forming the head 3', and mounted on the rod 1, there is a surrounding collar 4 into which the head 3' is tightly fitted. A longitudinal section of the head 3' is cut away forming the space 5.

The numeral 6 designates a conventional reel which is fastened to the elongated arcuate anchor 7 whose ends are tapered. The forward end of the anchor 7 is shaped to be fitted into the space 5, in mounting the reel, so as to retain said reel securely anchored to the sleeve 3. The other, or rearward end of the anchor may be secured in place on the sleeve 3 by means of the retaining ring 8.

The inner side of the ring 8 has a wedge-shaped circumferential cam or rib 9 thereon, and the sleeve 3 has the series 10, 11, of external, longitudinally spaced circumferential ribs thereon.

The series of ribs 10 and 11 are spaced apart so as to provide a space at one side of the sleeve sufficiently wide to permit the cam 9 to pass between the series as the retainer ring 8 is moved longitudinally along the sleeve 3, but the space between the series 10, 11, at the other side of the sleeve 3 is narrower than the length of the cam 9 so that the retainer ring 8 must be in the desired position before it can be moved longitudinally of the sleeve 3. The surface of the retainer ring 8 is knurled, as shown, to provide a gripping surface.

In use, the ring 8 may be so turned that the cam 9 will be located between the series of ribs 10, 11, as shown in Figure 5, and moved rearwardly into engagement with the stop 12 at the rear end of the sleeve 3. One end of the anchor 7 may then be inserted into the space 5, as shown in Figure 2, with the other end of said anchor located in the narrower space between the series of ribs 10, 11. The retainer ring may then be moved forwardly until it wedges over said last-mentioned end of the anchor 7, and said ring may then be turned to the right and the cam 9 will pass between the corresponding ribs 11 and will wedge over the anchor 7 to securely clamp said anchor in place.

The ends 13 of the ribs 11 are tapered so that the cam will readily pass between them. When it is desired to demount the reel, the ring 8 may be turned to the left to disengage the cam 9 from between the ribs 11, and the ring may then be moved rearwardly to release the anchor 7 to permit its detachment.

The drawing and description disclose what is now considered a preferred form of the invention by way of illustration only, while the broad principle of the invention will be defined by the appended claims.

What I claim is:

1. The combination with a sleeve having a retainer at one end to receive one end of a reel anchor, a ring on the sleeve movable into one position to release the anchor and into another position to engage the other end of the anchor, clamp means in the ring arranged to clamp said other end of the anchor to the sleeve upon rotary movement of the ring while in anchor-engaging position, and two series of spaced circumferential ribs on the sleeve, said series being spaced apart and arranged to interlock with the clamp means to prevent longitudinal movement of the ring relative to the sleeve when the ring is turned to one position on the sleeve and to release the clamp means when the ring is turned to another position.

2. A device for securing a reel anchor to a fishing rod comprising a sleeve having a retainer at one end to receive one end of the reel anchor, said sleeve having two series of external spaced ribs thereon arranged at right angles to the longitudinal axis of the sleeve, said series of ribs being spaced apart, the space between the series on one side of the sleeve being wider than that on the other side of the sleeve, and a retaining ring on the sleeve having inside clamp means thereon, said clamp means being of less length than the width of said wider space, whereby the ring may be moved freely longitudinally on the sleeve when the clamp means registers with said wider space, said ring being turnable on the sleeve to move the clamp means into interengagement with said ribs and into clamping relation with the other end of the reel anchor.

3. A device for securing a reel anchor to a fishing rod comprising a sleeve having a retainer at one end to receive one end of a reel anchor, said sleeve having two series of ribs thereon, the ribs of each series being spaced apart and the series being spaced apart to provide spaces between the series on opposite sides of the sleeve, one of said spaces between the series being wider than the other of said spaces, the narrower of said spaces between the series being provided to receive the other end of the reel anchor, and a retainer ring on the sleeve having an inside cam-shaped clamp means thereon of a length less than the width of the wider space and greater than the width of the narrower space whereby the clamp ring may be moved longitudinally on the sleeve when the clamp member registers with said wider space, said ring being turnable on the sleeve to carry said clamp means between the ribs of the series and in clamping relation with said other end of said anchor.

FERRIS S. HARRIS.